3,258,089
SPOT TYPE DISK BRAKE
Edward J. Hayes, Livonia, and Harvey C. Swift, Birmingham, Mich., assignors to Kelsey-Hayes Company, Romulus, Mich., a corporation of Delaware
Filed May 7, 1964, Ser. No. 365,590
8 Claims. (Cl. 188—73)

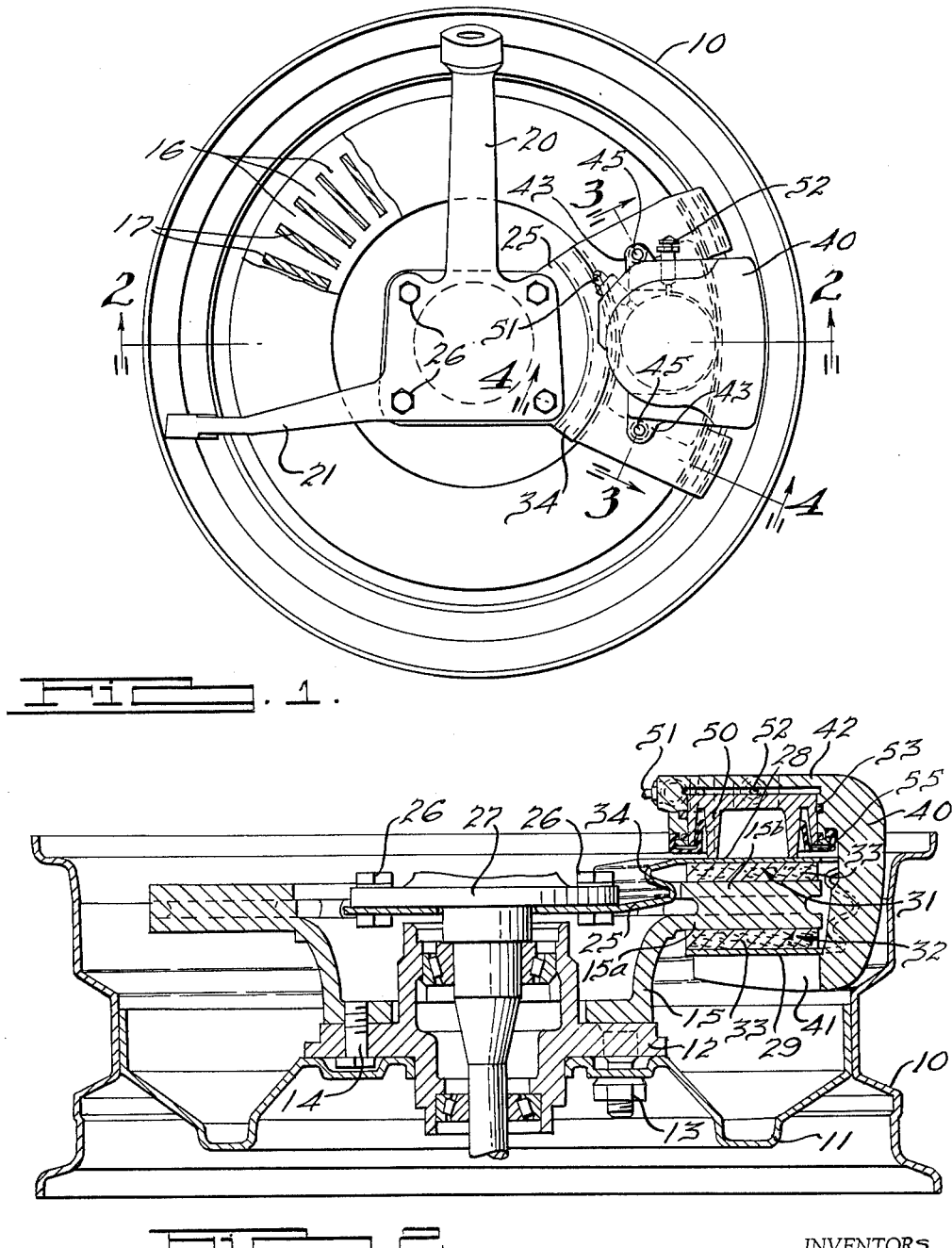

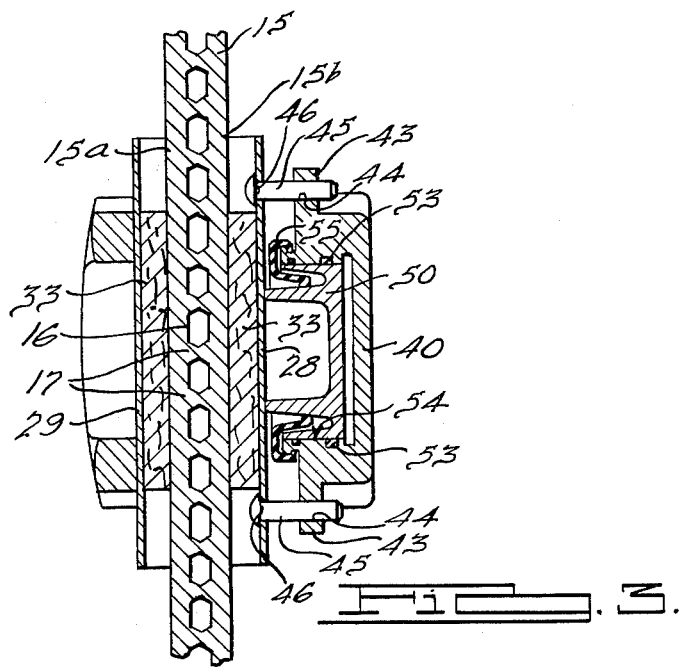
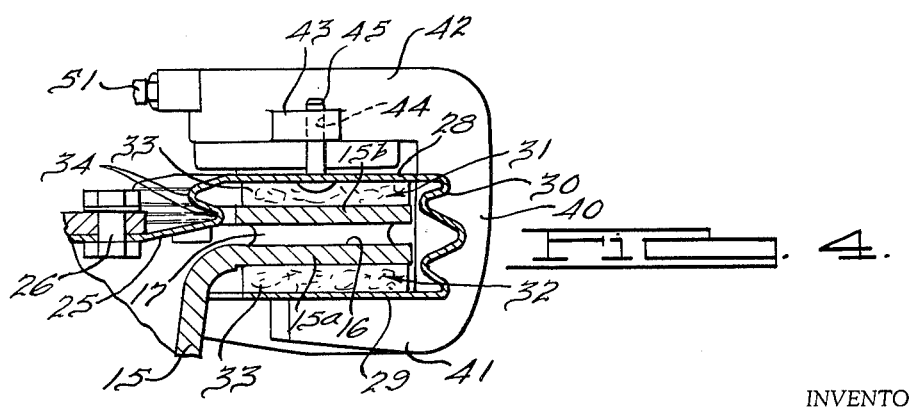

This invention relates to brakes for vehicles and, more particularly, to disk brakes and to improvements therein whereby the brake may be economically manufactured and quickly and easily assembled and installed.

One of the primary objects of this invention is to provide a disk brake having a floating caliper or yoke member and a torque member having means for slidably supporting said yoke member whereby it floats or moves in the direction of the axis of the wheel to continuously position the caliper or yoke member with respect to the brake disk during the application and release of the brakes.

Another object of the invention is to provide a brake of this type in which the torque member may be made from a single sheet of metal stamped or otherwise shaped to provide a portion which is relatively stiff or rigid in the torque direction adjacent the end thereof which is attached to a stationary part of the wheel axle housing and which is formed with one or more transversely extending pleats or folds to impart flexibility thereto in the direction of the axis of the wheel, whereby the caliper or yoke carried by said torque member may be continuously properly positioned with respect to the brake disk during the operation of the brake.

Another object of the invention is to provide a torque member which has a section modulus whereby it will bend in the direction of the wheel axis and as the brake linings become worn the torque member will periodically take a new set to properly position the brake shoe members to take up excessive clearance between the brake disk and the brake shoes due to the brake shoe lining becoming worn.

Another object of this invention is to provide a disk brake construction in which the caliper-like housing or yoke is slidably mounted on the outer end of the torque member for relative movement with respect thereto in the direction of the axis of the wheel but is secured against relative rotative movement whereby torque forces imparted to the caliper-like member are transmitted to the torque member.

Another object of the invention is to provide a disk brake of this type in which the free end of the torque member is provided with axially spaced terminal portions which support the brake shoe members or friction linings and in which said terminal portions are connected by one or more bendable portions in the form of accordion-like pleats or folds which permit the brake shoe members to be moved toward and away from the brake disk during the operation of the brake.

The various objects and advantages, and the novel details of construction of one commercially practical embodiment of the invention, will become more apparent as this description proceeds, especially when considered in connection with the accompanying drawings, in which:

FIGURE 1 is a rear elevational view of a disk brake constructed in accordance with this invention and mounted on a wheel;

FIGURE 2 is an enlarged sectional elevational view taken substantially on the plane indicated by line 2—2 in FIGURE 1;

FIGURE 3 is a fragmentary sectional view taken substantially on the plane indicated by line 3—3 in FIGURE 1; and FIGURE 4 is a fragmentary sectional view taken substantially on the plane indicated by line 4—4 in FIGURE 1.

The present invention is shown as being associated with a vehicle wheel having a rim 10 and a wheel body 11 secured to the axle flange 12 by means of studs or bolt and nut assemblies 13.

Also secured to the axle flange 12, either by the stud or bolt and nut assemblies 13 or by separate fastening bolts 14, is a brake disk 15. In the form of the invention illustrated, the brake disk 15 is formed with a pair of spaced walls 15a and 15b provided with a plurality of radially extending apertures or opening 16 therebetween with transverse webs 17 therebetween. The webs 17 function as fan blades and serve to move cooling air in a radially outward direction between the walls 15a and 15b when the brake disk is rotated. This serves to reduce the heat generated by the engagement of the brake shoes with the brake disk, as will be apparent.

If the wheel to which the brake is applied is the front steering wheel of the vehicle, it is provided with at least one arm 20 forming a part of the pivotal mounting of the wheel and an arm 21 connected to the steering linkage (not shown).

The reference character 25 indicates generally a torque member which is attached by bolts 26 to a fixed part 27 of the axle structure. The torque member or spider 25 is conveniently formed of sheet metal and is relatively wide transversely so as to make the same rigid in the direction of rotation of the wheel.

The torque member 25, at its free end, is provided with two pairs of axially spaced terminal portions 28 and 29 in the form of flange portions. These terminal portions are located on opposite sides of the caliper-like member, yet to be described. These terminal or flange portions 28 and 29 are connected by one or more transversely extending accordion-like pleats or folds 30 which impart flexibility to this portion of the torque member 25, whereby the terminal portions 28 and 29 may move toward and away from one another during the application and release of the brakes, as will become more apparent later.

Associated with the terminal portions 28 and 29 of the torque member 25 are brake shoe members, indicated generally by the reference characters 31 and 32. Each brake shoe member comprises a lining 33 adapted to engage the adjacent portions of the brake disk 15. As shown, the backing plate for the brake shoes may comprise the terminal or flange portions 28 and 29 of the torque member 25, although, obviously, separate backing plates may be provided for each brake shoe. When the brake shoes 31 and 32 are moved towards the brake disk 15, the terminal or flange portions 28 and 29 are permitted to move because of the flexibility provided by the pleats or folds 30.

The radially extending portion of the torque member 25 is provided with one or more accordion-like pleats or folds 34 which extend transversely of the torque member to increase the flexibility of the torque member in the direction of the axis of the wheel. While the pleats 34 are not absolutely essential, they provide, when employed, additional axial flexibility of the torque member so as to continuously locate and position the brake shoes 31 and 32 upon the application and release of the brakes.

The cross sectional modulus of the torque member 25 is such that as the brake shoe linings 33 become worn the torque member 25 will periodically take another or new set in the areas of the pleats or folds 30 and 34 so as to properly position the brake shoe members 31 and 32 whereby to take up excessive clearance between the brake shoe linings and the brake disk 15.

The reference character 40 indicates a caliper-like member or housing which straddles at least a portion of the periphery of the brake disk 15. The caliper member 40 is substantially C-shaped and one leg 41 thereof directly engages the terminal portion or flange 29 forming part of the brake shoe 32. The other leg 42 of the caliper 40 is provided with laterally extending ears or lugs 43, each of which is formed with an aperture or bore 44. Guide pins 45 are rigidly secured as at 46 to the terminal portion 28 of the torque member and slidably engage the apertures or passageways 44 formed in the ears 43 of the caliper member. The pins 45 and apertures 44 provide means for slidably mounting the caliper 40 on the free end of the torque member 25 so that it may move in the direction of the axis of the wheel.

Mounted in the leg 42 of the caliper member 40 is a piston 50, the inner end of which engages the flange or terminal portion 28 of the torque member. Fluid under pressure is supplied behind the piston 50 by means of a fluid pressure inlet 51. The reference character 52 indicates a bleed opening for bleeding the system of air at the outset of its operation, as is customary.

To restrict the free movement of the piston 50 an annular seal 53 is provided for the piston, preferably in the form of an O-ring, which engages the bore wall 54 of the cylinder in which the piston 50 operates. The piston may be provided with a flexible boot 55 formed of rubber, canvas, or any other suitable flexible material, to close the clearance between the piston and the cylinder 54 to exclude dust or other foreign material therefrom.

When fluid under pressure is supplied through inlet 51, the piston 50 is moved to engage the brake shoe 31 to move it into engagement with the surface 15b of the brake disk 15. The reaction of the caliper member 40 is to move in the opposite direction, which will cause the leg 41 of the caliper member to engage the other brake shoe 32 to move it into engagement with the surface 15a of the brake disk.

This slight movement of the caliper is permitted by means of the pins and apertures 45–44. Thus, the movement of the piston 50 into brake applying position simultaneously applies both brake shoes 31 and 32 to the brake disk 15. This slidable mounting of the caliper 40 permits the caliper to continuously position itself with respect to the brake shoes and brake disk. When the brake shoes 31 and 32 are moved toward the brake disk during the application of the brakes, and in the opposite direction upon release of the brakes, the necessary movement of the terminal or flange portions 28 and 29 is permitted by the accordion-like pleats or folds 30.

As previously mentioned, the torque member 25 is rigid or stiff in the torque direction, but is relatively flexible in the axial direction of the wheel and this flexibility is enhanced by providing the folds or pleats 34. Thus, the terminal or flange portions 28 and 29 of the torque member may continuously position themselves with respect to the brake disk 15 and the caliper member 40.

From the foregoing, it is believed that the construction and operation of this improved disk type brake will be readily apparent. The structure described comprises a simplified form of disk brake which may be economically manufactured, quickly and easily installed, and in which maintenance costs are reduced to a minimum.

While one commercially practical embodiment of the invention has been described and illustrated herein somewhat in detail, it will be understood that various changes may be made as may come within the purview of the accompanying claims.

What is claimed:

1. In a disk type brake for a wheel having a stationary axle part, a brake disk secured to said wheel for rotation therewith, a caliper member straddling at least a portion of the periphery of said brake disk, a pair of opposed brake shoe members, a torque member connected adjacent one end to said stationary axle part, said torque member being stiff in the torque direction and relatively flexible in the axial direction of the wheel, the free end of said torque member being provided with axially spaced terminal portions connected to said brake shoe members, a brake actuating piston carried by said caliper member for actuating one of said brake shoe members, and through the reaction of said caliper member to actuate the other brake shoe member, means slidably connecting said caliper member to said torque member, and a bendable portion connecting the terminal portions of said torque member to permit movement of the brake shoe members during the application and release of the brakes.

2. In a disk type brake for a wheel having a stationary axle part, a brake disk secured to said wheel for rotation therewith, a caliper member straddling at least a portion of the periphery of said brake disk, a pair of opposed brake shoe members, a torque member connected adjacent one end to said stationary axle part, said torque member being stiff in the torque direction and relatively flexible in the axial direction of the wheel, the free end of said torque member being provided with axially spaced terminal portions connected to said brake shoe members, a brake actuating piston carried by said caliper member for actuating one of said brake shoe members, a bendable portion connecting the terminal portions of said torque member to permit movement of the brake shoe members during the application and release of the brakes, and means slidably connecting said caliper member to said torque member for movement in the direction of the axis of the wheel whereby the reaction of said brake actuating piston will move said caliper member to actuate the other brake shoe member.

3. In a disk type brake for a wheel having a stationary axle part, a brake disk secured to said wheel for rotation therewith, a caliper member straddling at least a portion of the periphery of said brake disk, a torque member connected adjacent one end to said stationary axle part, said torque member being stiff in the torque direction and relatively flexible in the axial direction of the wheel, the free end of said torque member being provided with axially spaced flange portions, at least one of which is connected to said caliper to support the same, brake shoe members comprising linings connected to said spaced flange portions of the torque member, at least one accordion-like pleat connecting said flange portions to permit movement thereof toward and away from one another during the application and release of the brakes, and a brake actuating piston carried by said caliper member engaging one of said flange portions to actuate one of said brake shoe members and through the reaction of said caliper member to engage the other flange portion to actuate the other brake shoe member.

4. In a disk type brake for a wheel having a stationary axle part, a brake disk secured to said wheel for rotation therewith, a caliper member straddling at least a portion of the periphery of said brake disk, a torque member connected adjacent one end to said stationary axle part, said torque member being stiff in the torque direction and relatively flexible in the axial direction of the wheel, the free end of said torque member being provided with axially spaced flange portions, brake shoe members comprising linings connected to said spaced flange portions of the torque member, at least one accordion-like pleat connecting said flange portions to permit movement thereof toward and away from one another during the application and release of the brakes, a brake actuating piston carried by said caliper member engaging one of said flange portions to actuate one of said brake shoe members and through the reaction of said caliper member to engage the other flange portion to actuate the other brake shoe member, and means for slidably connecting said caliper member to said torque member comprising a pin carried by one of said members and slidably engaging an aperture in the other member.

5. In a disk type brake for a wheel having a stationary axle part, a brake disk secured to said wheel for rotation therewith, a caliper member straddling at least a portion of the periphery of said brake disk, a pair of opposed brake shoe members, a torque member connected adjacent one end to said stationary axle part, said torque member being stiff in the torque direction and relatively flexible in the axial direction of the wheel, the free end of said torque member being provided with axially spaced terminal portions connected to said brake shoe members, a brake actuating piston carried by said caliper member for actuating one of said brake shoe members, and through the reaction of said caliper member to actuate the other brake shoe member, means slidably connecting said caliper member to said torque member, a bendable portion connecting the terminal portions of said torque member to permit movement of the brake shoe members during the application and release of the brakes, and at least one accordion-like pleat extending transversely of said torque member to increase the flexibility of said torque member in the axial direction of the wheel.

6. In a disk-type brake for a wheel having a stationary axle part, a brake disk secured to said wheel for rotation therewith, a caliper member straddling at least a portion of the periphery of said brake disk, a pair of opposed brake shoe members, a torque member connected adjacent one end to said stationary axle part, said torque member being stiff in the torque direction and relatively flexible in the axial direction of the wheel, the free end of said torque member being provided with axially spaced terminal portions connected to said brake shoe members, a bendable portion connecting said terminal portions to permit movement of the brake shoe members during the application and release of the brakes, a brake actuating piston carried by said caliper member for moving one of said brake shoe members, means slidably connecting said caliper member to said torque member for movement in the direction of the axis of the wheel whereby the reaction of said brake actuating piston will move said caliper member to move the other brake shoe member, and at least one accordion-like fold extending transversely of said torque member to increase the flexibility of said torque member in the direction of the axis of the wheel.

7. In a disk type brake for a wheel having a stationary axle part, a brake disk secured to said wheel for rotation therewith, a caliper member straddling at least a portion of the periphery of said brake disk, a pair of opposed brake shoe members, a torque member stiff in the torque direction and relatively flexible in the axial direction of the wheel connected adjacent one end to said stationary axle part, the free end of said torque member being provided with axially spaced terminal portions connected to said brake shoe members, a brake actuating piston carried by said caliper member for actuating one of said brake shoe members, and through the reaction of said caliper member to actuate the other brake shoe member, means slidably connecting said caliper member to said torque member, and a bendable portion connecting the terminal portions of said torque member to permit movement of the brake shoe members during the application and release of the brakes, the cross sectional modulus of said torque member in the area of said bendable portion being such that as the brake linings become worn the torque member will periodically take a new set to provide the proper clearance between the brake shoe linings and the brake disk.

8. In a disk type brake for a wheel having a stationary axle part, a brake disk secured to said wheel for rotation therewith, a caliper member straddling at least a portion of the periphery of said brake disk, a pair of opposed brake shoe members, a torque member stiff in the torque direction and relatively flexible in the axial direction of the wheel connected adjacent one end to said stationary axle part, the free end of said torque member being provided with axially spaced terminal portions connected to said brake shoe members, a brake actuating piston carried by said caliper member for actuating one of said brake shoe members, and through the reaction of said caliper member to actuate the other brake shoe member, means slidably connecting said caliper member to said torque member, a bendable portion connecting the terminal portions of said torque member to permit movement of the brake shoe members during the application and release of the brakes, and at least one accordion-like pleat extending transversely of said torque member to increase the flexibility of said torque member in the axial direction of the wheel, the cross sectional modulus of said torque member in the area of said accordion-like pleat being such that as the brake linings become worn the torque member will periodically take a new set to provide the proper clearance between the brake shoe linings and the brake disk.

References Cited by the Examiner

UNITED STATES PATENTS 2,351,041    6/1944    Hawley _____ 188—152

FOREIGN PATENTS 1,334,984    7/1963    France.
  926,992    5/1963    Great Britain.
  205,388    9/1939    Switzerland.

FERGUS S. MIDDLETON, *Primary Examiner.*

MILTON BUCHLER, *Examiner.*

G. E. A. HALVOSA, *Assistant Examiner.*